US009586376B2

(12) United States Patent
Middlemiss et al.

(10) Patent No.: US 9,586,376 B2
(45) Date of Patent: Mar. 7, 2017

(54) HIGH PRESSURE HIGH TEMPERATURE CELL

(71) Applicant: SMITH INTERNATIONAL, INC., Houston, TX (US)

(72) Inventors: Stewart N. Middlemiss, Salt Lake City, UT (US); Yahua Bao, Orem, UT (US); Lan Carter, Payson, UT (US)

(73) Assignee: SMITH INTERNATIONAL, INC., Houston, TX (US)

( * ) Notice: Subject to any disclaimer, the term of this patent is extended or adjusted under 35 U.S.C. 154(b) by 898 days.

(21) Appl. No.: 13/836,396

(22) Filed: Mar. 15, 2013

(65) Prior Publication Data

US 2013/0263748 A1 Oct. 10, 2013

Related U.S. Application Data

(60) Provisional application No. 61/621,911, filed on Apr. 9, 2012.

(51) Int. Cl.
*B30B 15/34* (2006.01)
*B01J 3/06* (2006.01)
*B30B 11/00* (2006.01)

(52) U.S. Cl.
CPC ............... *B30B 15/34* (2013.01); *B01J 3/067* (2013.01); *B30B 11/004* (2013.01)

(58) Field of Classification Search
CPC ......... B30B 15/34; B30B 11/004; B01J 3/067
USPC ..................................... 425/77, 405.1–405.2
See application file for complete search history.

(56) References Cited

U.S. PATENT DOCUMENTS

| 3,030,662 | A | * | 4/1962 | Strong | B01J 3/06 |
| | | | | | 249/114.1 |
| 3,407,445 | A | * | 10/1968 | Strong | B01J 3/062 |
| | | | | | 425/77 |
| 3,647,331 | A | | 3/1972 | Kuratomi | |
| 3,806,471 | A | * | 4/1974 | Mitchell | H01B 1/22 |
| | | | | | 252/519.31 |
| 4,097,208 | A | | 6/1978 | Ishizuka | |
| 4,103,100 | A | | 7/1978 | Kabayama | |
| 5,190,734 | A | | 3/1993 | Frushour | |

(Continued)

FOREIGN PATENT DOCUMENTS

CN     101161867 A     4/2008
CN     102989373 A     3/2013

(Continued)

OTHER PUBLICATIONS

International Search Report and Written Opinion of PCT Application No. PCT/US2013/035543 dated Jul. 9, 2013.

(Continued)

*Primary Examiner* — Joseph S. Del Sole
*Assistant Examiner* — Thukhanh T Nguyen (57) ABSTRACT

A high-pressure high-temperature cell including two or more thermal insulation layers is described. A high-pressure high-temperature cell including a current path through a thermal insulation layer, the current path being electrically connected to a heating element and having an indirect path through the thermal insulation layer, is also described. High-pressure high-temperature press systems including the foregoing high-pressure high-temperature cells alone or in combination are also disclosed.

18 Claims, 10 Drawing Sheets

(56) References Cited

U.S. PATENT DOCUMENTS

| | | |
|---|---|---|
| 5,552,039 A | 9/1996 | McBrayer, Jr. et al. |
| 5,796,107 A | 8/1998 | Buchtemann et al. |
| 5,858,525 A | 1/1999 | Carter et al. |
| 8,057,597 B2 | 11/2011 | Martin Parrondo et al. |
| 2006/0159436 A1 | 7/2006 | Yuasa et al. |
| 2008/0193579 A1 | 8/2008 | Hall et al. |
| 2009/0272416 A1 | 11/2009 | Malik |
| 2010/0079842 A1 | 4/2010 | Dunleavy et al. |
| 2011/0020081 A1 | 1/2011 | Webb et al. |
| 2012/0312227 A1* | 12/2012 | Zhu ............... B01J 3/062 117/7 |
| 2013/0160700 A1 | 6/2013 | Kim et al. |

FOREIGN PATENT DOCUMENTS

| | | |
|---|---|---|
| EP | 816526 A2 | 1/1998 |
| KR | 10-2004-0042576 A | 5/2004 |
| WO | 0172405 A1 | 10/2001 |
| WO | 0224603 A1 | 3/2002 |
| WO | 2005067530 A2 | 7/2005 |

OTHER PUBLICATIONS

Osipov, A.S. et al., "Rapid sintering of nano-diamond compacts", Diamond & Related Materials 18 (2009) 1061-1064.

Palyanov, Y.N. et al., "The effect of composition of mantle fluids/melts on diamond formation processes", Lithos 112S (2009) 690-700.

Walker, D., "Lubrication, gasketing, and precision in multianvil experiments" American Mineralogist, vol. 76, pp. 1092-1100, 1991.

Bhaumic, S.K., "A modified high-temperature cell (up to 3300 K) for use with a cubic press", Rev. Sci. Instrum. 67 (10), Oct. 1996.

Wen-Dan, W. et al., "Research on pressure generation efficiency of 6-8 type multianvil high pressure apparatus", Acta Physica Sinica 59 (5), May 2010. pp. 3107-3115.

International Search Report and Written Opinion of PCT Application No. PCT/US2013/035549 dated Jul. 15, 2013.

Shatskiy et al., "High pressure generation using scaled-up Kawai-cell", Physics of the Earth and Planetary Interiors., vol. 189, 2011, pp. 92-108.

Frost, "A new large-volume multi anvil system", Physics of the Earth and Planetary Interiors, vol. 143, issue 1-2, pp. 507-514, 2004.

* cited by examiner

HIGH PRESSURE HIGH TEMPERATURE CELL

CROSS-REFERENCE TO RELATED APPLICATION

This application claims the benefit of U.S. Provisional Patent Application Ser. No. 61/621,911 filed Apr. 9, 2012, which is incorporated herein by reference in its entirety.

BACKGROUND

High-pressure high-temperature (HPHT) cells are used to form ultra-hard materials such as polycrystalline diamond (PCD) and polycrystalline cubic boron nitride (PCBN), which in turn are used in tools such as cutting tools and rock drilling tools. HPHT cells are used in HPHT presses such as, cubic presses, belt presses, and toroid presses. The HPHT press uses solid media to transmit pressure to a heated volume. To form ultra-hard materials, HPHT presses often apply pressures in the range of 5 to 8 GPa and temperatures in the range of 1300 to 1650° C. For example, PCD may be sintered at 5 to 7 GPa and 1400 to 1500° C.

The formation of certain ultra-hard materials, such as thermally stable PCD, involves sintering at much higher temperatures. In particular, PCD formed using a carbonate catalyst may be sintered at a pressure greater than 6.5 GPa and a temperature greater than 2000° C. Additionally, binderless nano-polycrystalline PCD may be sintered at a pressure of about 15 GPa and a temperature of about 2300° C.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the disclosed subject matter relate to a high-pressure high-temperature (HPHT) cell for forming ultra-hard materials, the high-pressure high-temperature cell including two or more thermal insulation layers. By including two or more thermal insulation layers, each thermal insulation layer can be configured to have properties tailored to a particular purpose. For example, one thermal insulation layer (e.g., an outer or second thermal insulation layer) can have (e.g., can be configured to have gasketing properties), and another thermal insulation layer (e.g., an inner or first thermal insulation layer) can have (e.g., can be configured to have) relatively greater thermal insulation properties than the other thermal insulation layer (e.g., the outer or second thermal insulation layer).

An aspect of an embodiment is directed to an HPHT cell including an interior volume, two or more thermal insulation layers including a first thermal insulation layer at least partially surrounding the interior volume and including a first thermal insulation material including cesium chloride (CsCl), cesium bromide (CsBr), cesium iodide (CsI) or a combination thereof; and a second thermal insulation layer at least partially surrounding the first thermal insulation layer and including a second thermal insulation material, the second thermal insulation material being different from the first thermal insulation material The first thermal insulation layer may reflect heat and the second thermal insulation layer may seal the high-pressure high-temperature cell.

The second thermal insulation layer may include pyrophyllite or a synthetic gasket material.

The first thermal insulation layer may have an electrical resistivity of more than about 0.1 ohm·cm.

The first thermal insulation layer may include a thermal insulation sleeve and a thermal insulation button.

The first thermal insulation layer may further include an additive.

The additive may reflect and/or absorb thermal radiation.

The additive may be present in the first thermal insulation layer in an amount in a range of about 0.1 to about 50 volume percent based on the total volume of the first thermal insulation layer.

The additive may be present in the first thermal insulation layer in an amount of less than 5 volume percent based on the total volume of the first thermal insulation layer.

Aspects of embodiments are also directed to an HPHT press system including the HPHT cell according to any of the above.

Aspects of embodiments of the disclosed subject matter are also directed to a high-pressure high-temperature cell including an interior volume; a heating element at least partially surrounding the interior volume; a thermal insulation layer at least partially surrounding the heating element; and a current path through the thermal insulation layer and electrically connected to the heating element, the current path having an indirect path through the thermal insulation layer. By including a current path having an indirect path through the thermal insulation layer, the high-pressure high-temperature cell may reduce the conduction and/or radiation of heat from the cell interior volume to the outside of the cell, as the amount of heat that can directly escape the interior volume by way of the current path is reduced.

The current path may include a first portion and a second portion in a staggered configuration.

The current path may direct heat from the heating element toward the thermal insulation layer and the thermal insulation layer may reflect the heat toward the interior volume.

The current path may extend in at least two different directions in the thermal insulation layer. In another embodiment, the current path extends in at least three different directions in the thermal insulation layer.

The current path may include at least two electrically connected coaxial cylinders, one of the cylinders having a larger diameter than that of the other cylinder.

The thermal insulation layer may include a first thermal insulation layer at least partially surrounding the heating element and including a first thermal insulation material, and a second thermal insulation layer at least partially surrounding the first thermal insulation layer and including a second thermal insulation material, the second thermal insulation material being different from the first thermal insulation material.

The current path may include a first portion in the first thermal insulation layer and a second portion in the second thermal insulation layer, and the first portion and the second portion may be in a staggered configuration.

The first thermal insulation layer may include a material including (CsCl), cesium bromide (CsBr), cesium iodide (CsI) or a combination thereof, and the second thermal insulation layer may include pyrophyllite or a synthetic gasket material.

The thermal insulation layer may further include a third thermal insulation layer between the second thermal insulation layer and a portion of the current path.

The third thermal insulation layer may include a third thermal insulation material that is the same (or substantially the same) as the first thermal insulation material.

Aspects of embodiments are also directed to an HPHT press system including an HPHT cell according any of the above.

Another aspect of embodiments is directed to an HPHT cell including an interior volume, a thermal insulation layer at least partially surrounding the interior volume, and a gasketing layer at least partially surrounding the thermal insulation layer.

BRIEF DESCRIPTION OF THE DRAWINGS

The accompanying drawings, together with the specification, illustrate embodiments of the present disclosure, and, together with the description, serve to explain the principles of the present disclosure.

DETAILED DESCRIPTION

In the following detailed description, only certain embodiments of the present disclosure are shown and described, by way of illustration. As those skilled in the art would recognize, the present disclosure may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

Embodiments of the present disclosure will now be described with reference to the accompanying drawings, in which embodiments of the present disclosure are shown. The drawings are illustrative in nature and are not to be construed as limiting the present disclosure. In the drawings, the thickness of layers and regions may be exaggerated for ease of illustration.

Figure 1:
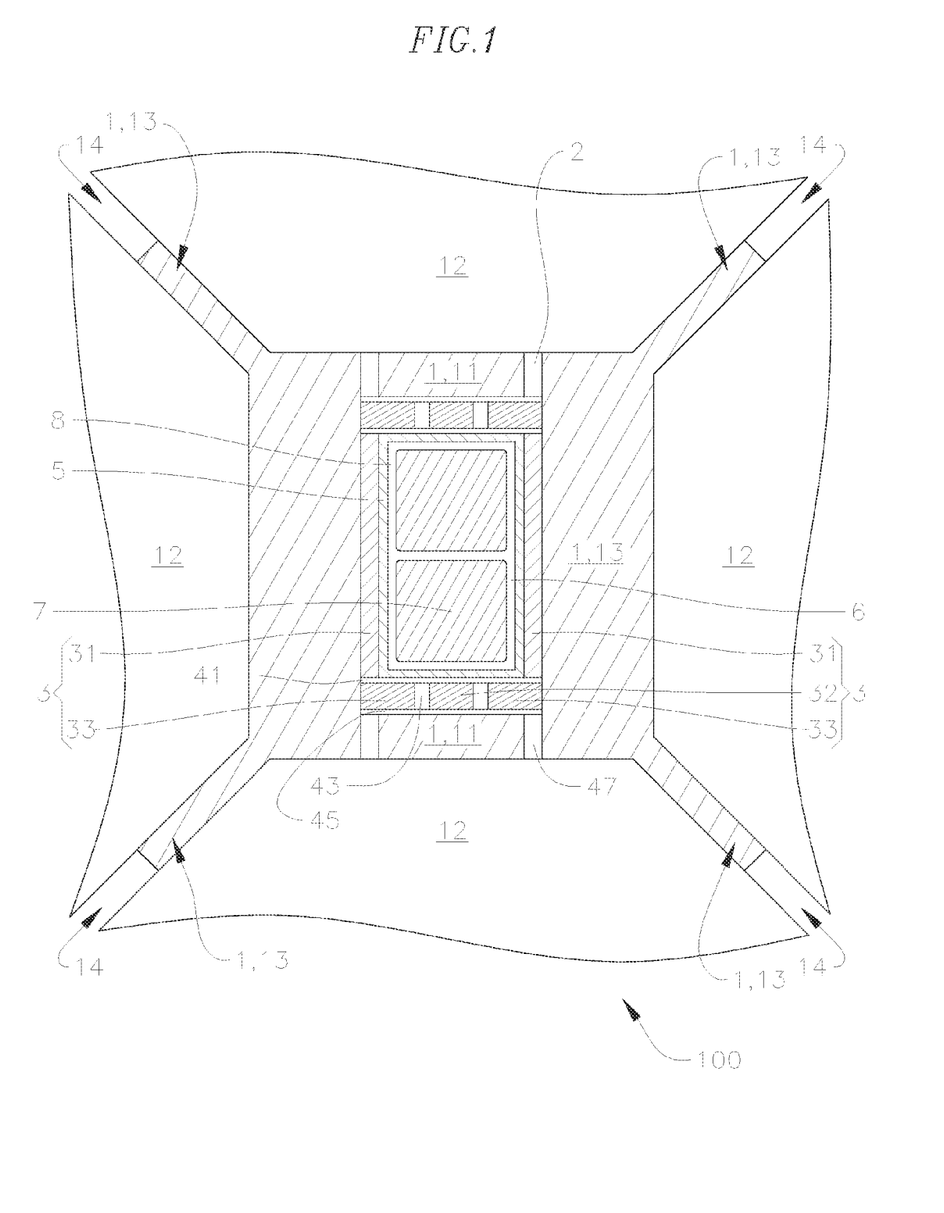
FIG. 1 is a schematic cross-sectional view of an embodiment of a high-pressure high-temperature cell of a high-pressure high temperature press.

An embodiment of an high-pressure high-temperature (HPHT) cell for a cubic press at pressure is shown in FIG. 1. The HPHT cell 100 shown in FIG. 1 can be used in HPHT presses used for making ultra-hard materials, such as polycrystalline diamond (PCD) and polycrystalline cubic boron nitride (PCBN), or processing such ultra-hard materials into polycrystalline composites. HPHT presses are well described in patents and literature and are in use by several makers of polycrystalline ultra-hard materials.

As shown in FIG. 1, a high-pressure high-temperature cell 100 according to an embodiment includes two or more thermal insulation layers including a first thermal insulation layer 3 (e.g., including thermal insulation sleeve 31 and/or thermal insulation button 32 and 33). The thermal insulation sleeve 31 and thermal insulation button 32 and 33 may each be formed from powder, and they may each be formed of the same (or substantially the same) or different material. The first thermal insulation layer 3 at least partially surrounds an interior volume 6 (e.g., a cell working volume). The first thermal insulation layer 3 includes a first thermal insulation material and facilitates the retention of heat in the cell 100, and more particularly in the interior volume 6, which includes a product being manufactured 7 and a pressure transfer medium 8. Accordingly, in one embodiment, the first thermal insulation material layer reflects and/or absorbs heat (e.g., is configured to reflect and/or absorb heat). For example, the first thermal insulation material may be configured or adapted to reflect and/or absorb heat.

In one embodiment, the HPHT cell 100 further includes a second thermal insulation layer 1 (e.g., including thermal insulation layers 11 and 13). The thermal insulation layers 11 and 13 may each be formed of the same (or substantially the same) or different material. The ratio of the thickness of the first thermal insulation layer to the thickness of the second thermal insulation layer may be in a range of 1:1 to 1:8. For example, in one embodiment, the ratio of the thickness of the first thermal insulation layer to the thickness of the second thermal insulation layer may be about 1:2. In one embodiment, the second thermal insulation layer 1 includes a second thermal insulation material and also facilitates the retention of heat in the cell 100, and the interior volume 6. Additionally, the second thermal insulation layer seals the HPHT cell 100 (e.g., is configured to seal the HPHT cell 100). For example, in one embodiment, the second thermal insulation layers 11 and 13 function as gaskets. Accordingly, in one embodiment, the second thermal insulation material is different from the first insulation material, and is a material that has good flow properties at low pressures and demonstrates an increase in shear strength at high pressures. For example, in one embodiment the second thermal insulation material is pyrophyllite or a synthetic gasket material (e.g., a material made of earth materials, ceramics, glasses or a combination thereof) designed to possess these characteristics, such as the synthetic gasket materials described in U.S. Pat. No. 5,858,525, the entire contents of which are herein incorporated by reference. During pressurization, the second thermal insulation layer 13 flows into the gaps 14.

After pressurization, the gaskets (e.g., second thermal insulation layer 1) will flow and extrude into the configuration shown in FIG. 1.

By including two or more thermal insulation layers (e.g., the first thermal insulation layer 3 and the second thermal insulation layer 1), each thermal insulation layer can be configured to have properties tailored to a particular purpose. For example, one thermal insulation layer (e.g., the second thermal insulation layer 1 or outer thermal insulation layer) can seal the HPHT cell (e.g., can be configured to seal the HPHT cell) by having gasketing properties, and another thermal insulation layer (e.g., the first thermal insulation layer 3 or inner thermal insulation layer) can reflect and/or absorb heat (e.g., can be configured to reflect and/or absorb heat) by having relatively greater thermal insulation properties than the other thermal insulation layer (e.g., the second thermal insulation layer 1).

Many existing HPHT cells use the same (or substantially the same) material for gasketing (e.g., sealing) the high pressure volume of the cell and for insulating the cell thermally. Because the same (or substantially the same) material is used to accomplish different purposes, the selection of the material often results in a compromise in the properties of the material. By including two or more insulating layers in embodiments of the HPHT cell, the roles and demands of the gasketing and insulation materials can be separated and the properties of the materials tailored to suit the intended purpose.

As shown in FIG. 1, one embodiment of the HPHT cell also includes a current path 2, which may be formed of metals, graphite or other electrically conductive materials, but the present disclosure is not limited thereto. The current path 2 is electrically connected to a heating element 5 (e.g., cell heating tube), which may include graphite. The heating element 5 at least partially surrounds the interior volume 6 and provides heat to the interior volume 6 by way of electrical heating. The current path 2 is separate from the thermal insulation layer (e.g., the first and second thermal insulation layers). The HPHT cell 100 also includes components 41, 43, 45 and 47 which form the current path 2. The components 41, 43, and 45 may include refractory metals such as, but not limited to, Mo, Ta, etc., and form part of the electrical circuit in the cell. Refractory metals may also be used to encapsulate the products being pressed in the interior volume 6 (cell working volume).

Heating of the cell is accomplished by allowing an electric current to flow from an anvil 12 at one end of the cell through the current path 2, including the components 41, 43, and 45, heating element 5 (e.g., a heating tube) and then via the corresponding components at the other end of the cell to the opposite anvil 12. In certain embodiments, the electric current does not flow (e.g., does not primarily flow) through the first thermal insulation layer 3 (e.g., the thermal insulation sleeve 31 and/or thermal insulation button 32 and 33) and/or the second thermal insulation layer 1 (e.g., second thermal insulation layers 11 and 13). For example, the first thermal insulation layer 3 and/or the second thermal insulation layer 1 may be electrically insulating. As used herein, the term "electrically insulating" means that an electrically insulating layer has an electrical resistance (e.g., electrial resistivity) such that the layer does not allow an electric current, sufficient to power a heating element to heat an interior volume of an HPHT cell to a temperature sufficient for HPHT pressing, to pass through such layer. For example, when the first thermal insulation layer 3 and/or the second thermal insulation layer 1 are electrically insulating, the first thermal insulation layer 3 and/or the second thermal insulation layer 1 do not conduct an electric current sufficient to power the heating element 5 to heat the interior volume 6 to a temperature sufficient for HPHT pressing, and, instead, the electric current for powering the heating element 5 is primarily conducted through a component that is separate from the first thermal insulation layer and/or the second thermal insulation layer 1, such as the current path 2. In some embodiments, the first thermal insulation layer 3 has an electrical resistivity of more than about 0.1 ohm·cm.

The heating tube may be the highest resistance element in the cell so the largest fraction of electrical power may be dissipated in this element, causing the temperature to rise above that of the other elements in the cell. The purpose of the first thermal insulation layer 3 (e.g., the thermal insulation sleeve 31 and/or its corresponding thermal insulation button 32 and 33, e.g., disk elements) is to insulate the central portion of the cell and minimize heat flow out of the central portion of the cell. This makes heating the cell more energetically efficient and minimizes heat flow into the anvils 12, which can reduce their performance. The product 7 being manufactured, may be surrounded by a salt, such as NaCl, CsCl, CsBr, or CsI, which acts as a pressure transfer medium 8. After a suitable period of heating, the electric current is turned off and the cell allowed to cool down and then depressurized to recover the product.

As can be seen in FIG. 1, in certain embodiments, the first thermal insulation layer 3 (e.g., the thermal insulation sleeve 31 and/or thermal insulation button 32 and 33) is separated from the anvils 12 by the second thermal insulation layer 1 (e.g., the second thermal insulation layers 11 and 13). In one embodiment, the second thermal insulation layer includes a second thermal insulation material that is different from the first thermal insulation material of the first thermal insulation layer 3.

Figure 2:
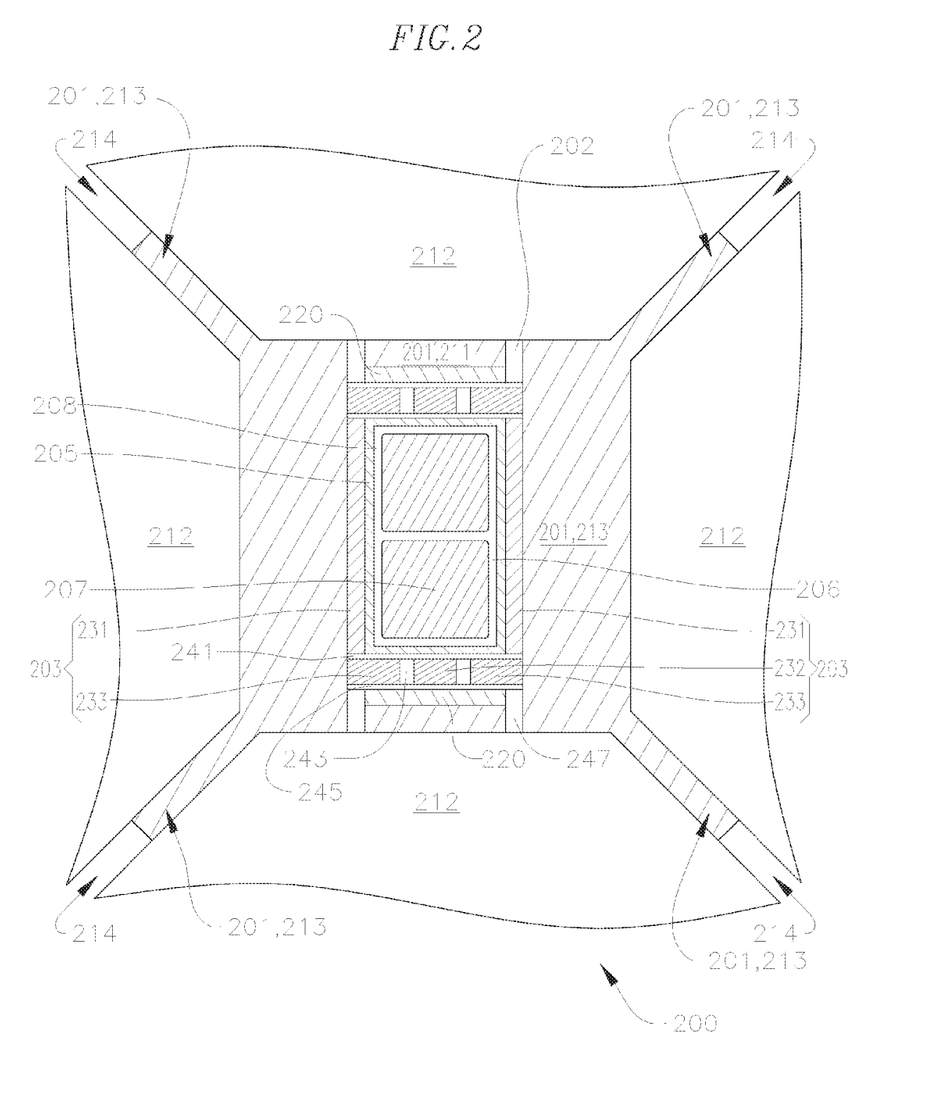
FIG. 2 is a schematic cross-sectional view of another embodiment of a high-pressure high-temperature cell of a high-pressure high-temperature press.

An HPHT cell 200 according to another embodiment is shown in FIG. 2. The HPHT cell 200 includes a first thermal insulation layer 203 (e.g., including thermal insulation sleeve 231 and/or thermal insulation button 232 and 233) at least partially surrounding an interior volume 206, which includes a product being manufactured 207 and a pressure transfer medium 208. The HPHT cell further includes a second thermal insulation layer 201 (e.g., including thermal insulation layers 211 and 213) and heating element 205 at least partially surrounding the interior volume 206, a current path 202 including components 241, 243, 245, and 247, anvils 212, and gaps 214 between the anvils 212. The above-described features of the HPHT cell 200 are substantially the same as those described above and below with respect to the HPHT cell 100 and, therefore, further description thereof will be omitted here.

According to the embodiment shown in FIG. 2, the HPHT cell 200 also includes a third thermal insulation layer 220. As shown in FIG. 2, according to this particular embodiment, the third thermal insulation layer 220 is between the second thermal insulation layer 201 and a portion of the current path 202 (e.g., the components 241 and 243). Similarly to the first insulation layer 201, the third thermal insulation layer 220 facilitates the retention of heat in the interior volume 206. Accordingly, in one embodiment, the third thermal insulation layer 220 includes a third insulation material that is the same (or substantially the same) as the first thermal insulation material, but the present disclosure is not limited thereto. For example, in some embodiments, the third insulation material is different from the first insulation material. The first thermal insulation material will now be described in more detail with reference to FIG. 1 with the understanding that the following description also relates to the corresponding features of FIG. 2.

Referring back to FIG. 1, embodiments of the first thermal insulation layer 3 (i.e., the thermal insulation sleeve 31 and/or thermal insulation button 32 and 33) include a first thermal insulation material including CsCl, CsBr, CsI or a combination thereof. In certain embodiments, the CsBr or CsI has a CsCl crystal structure. The materials CsCl, CsBr, and CsI each have a relatively low thermal conductivity, as compared to other thermal insulation materials that are suitable for HPHT cells, such as $ZrO_2$. For example, the thermal conductivity of CsCl is about 0.95 $Wm^{-1}K^{-1}$ at standard temperature and pressure, which is substantially lower than the about 2.5 $Wm^{-1}K^{-1}$ thermal conductivity of $ZrO_2$, under the same conditions. As a result, materials such as CsCl, CsBr, and CsI conduct less heat than materials such as $ZrO_2$, even though CsCl, CsBr, and CsI do little to prevent or reduce the transfer of heat by way of thermal radiation. By including a material having a low thermal conductivity (e.g., lower than that of $ZrO_2$), such as CsCl, CsBr, or CsI, embodiments of a first thermal insulation layer can reduce the amount of heat that is conducted away from the interior volume 6, thereby increasing the temperature attained within the interior volume 6. That is, the first thermal insulation layer 3 traps at least a portion of the heat generated by the heating element 5 in the interior volume 6, thereby increasing the temperature within the interior volume 6 and facilitating the formation of polycrystalline ultra-hard materials or polycrystalline composites.

Although materials such as CsCl, CsBr, and CsI have low thermal conductivities, and therefore, reduce the amount of heat that is conducted away from the interior volume 6, these materials are also virtually transparent to thermal radiation. As such, materials such as CsCl, CsBr, and CsI do relatively little to reduce the amount of heat that is radiated away from the interior volume 6. Consequently, the thermal insulation provided by the first thermal insulation layer 3 can be greatly improved by further including an additive, such as an additive that reflects and/or absorbs thermal radiation (e.g., blocks thermal radiation), such as an additive that is configured to reflect and/or absorb thermal radiation. For example, including certain amounts of an additive, such as electrically conductive particles, in the first thermal insulation layer 3 may improve the cell insulation due to thermal radiation shielding provided by the additive. By further including the additive, the first thermal insulation layer 3 may further reduce the amount of heat that is radiated (i.e., emitted) away from the interior volume 6, thereby further increasing the temperature attained at the interior volume 6. The additive may be included in the first thermal insulation layer 3 by way of any suitable method of combining the additive and at least one of CsCl, CsBr, or CsI. For example, the additive may be combined with at least one of CsCl, CsBr, or CsI by dry powder mixing.

Suitable materials for the additive include materials that are capable of reflecting and/or absorbing thermal radiation (i.e., materials that have good radiation blocking properties), such as electrically conductive or semiconductive particles or electrically conductive or semiconductive powders. In certain embodiments, non-limiting examples of the additive include chromites, ferrites, metals, and combinations thereof. For example, the additive may include chromite according to the formulas $LCrO_3$ or $M^1Cr_2O_4$, wherein L is yttrium or a rare earth element, and $M^1$ is a transition metal, Mg or Li. Chromite may be $LaCrO_3$, $FeCr_2O_4$, $CoCr_2O_4$, $MgCr_2O_4$ or a combination thereof, but the present disclosure is not limited thereto. Chromite may be doped with Mg, Ca, Sr or a combination thereof. Doping the chromite may improve its electrical conductivity. In some embodiments, the additive includes ferrite according to the formula $M^{II}Fe_2O_4$ or $M^{III}Fe_{12}O_{19}$, wherein $M^{II}$ is a transition metal, Mg, or Li, and $M^{III}$ is Ba, Sr, or a combination thereof. Ferrite may be $Fe_3O_4$, $CoFe_2O_4$, $ZnFe_2O_4$, $BaFe_{12}O_{19}$, $SrFe_{12}O_{19}$, $Mn_aZn_{(1-a)}Fe_2O_4$, $Ni_aZn_{(1-a)}Fe_2O_4$ or a combination thereof, wherein a is in a range of 0.01 to 0.99, but this listing is not exhaustive. In certain embodiments, the metal is a refractory metal such as Ti, V, Cr, Zr, Nb, Mo, Ru, Rh, Hf, Ta, W, Re, Os, Ir, Pt, or a combination thereof, but the present disclosure is not limited thereto. In other embodiments, non-limiting examples of the metal include Al, Fe, Mn, Ni, Co, Cu, B, Si, Be, Mg, Ca, Sr, Ba and combinations thereof. In certain embodiments, the additive includes electrically insulating particles. For example, the additive may include $ZrO_2$, MgO, CaO, $Al_2O_3$, $Cr_2O_3$, and aluminates (e.g., $FeAl_2O_4$).

Figure 4:
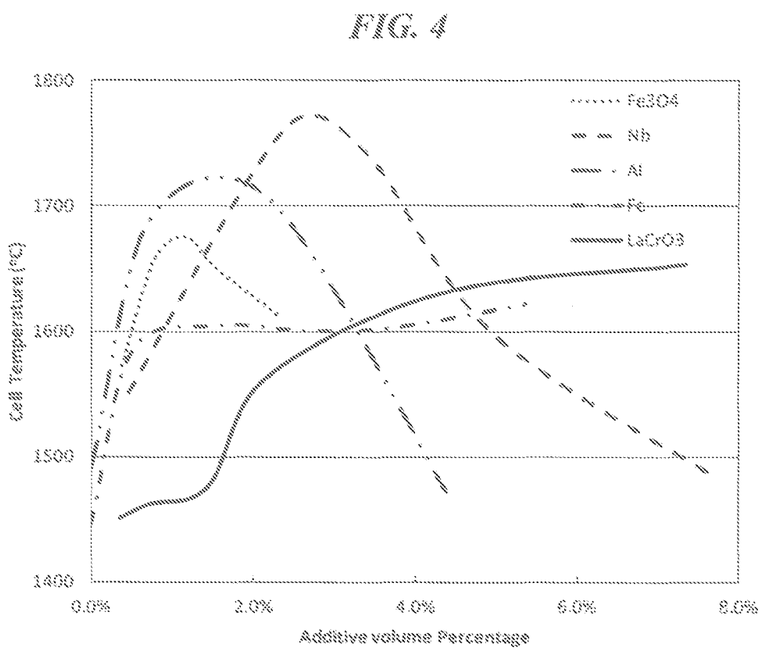
FIG. 4 is a graph of the cell temperature (° C.) achieved by heating examples of a high-pressure high-temperature cell at a power level of 2100 W vs. the volume percent of additive included in each high-pressure high-temperature cell in a thermal insulation sleeve including CsCl.
Figure 5:
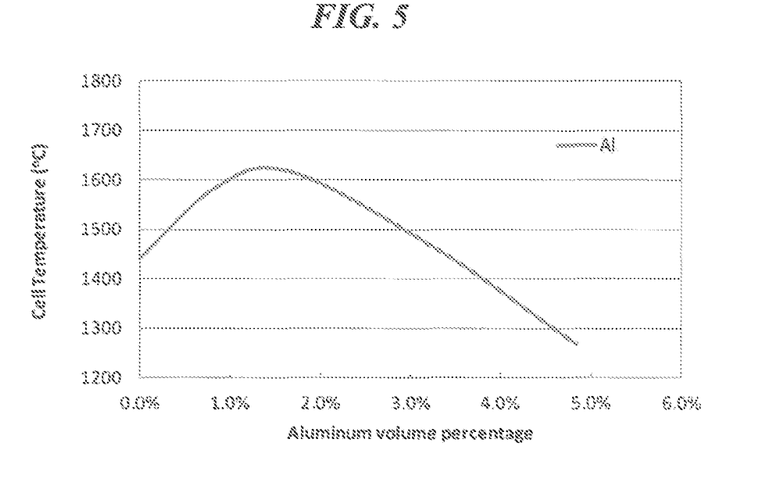
FIG. 5 is a graph of the cell temperature (° C.) achieved by heating examples of a high-pressure high-temperature cell at a power level of 2100 W vs. the volume percent of additive included in each high-pressure high-temperature cell in a thermal insulation sleeve including CsBr.

The present applicants have discovered that embodiments of the thermal insulation layers (e.g., thermal insulation sleeves and/or thermal insulation buttons including CsCl, CsBr, or CsI and, optionally, an additive) perform substantially better than thermal insulation layers that primarily include $ZrO_2$. For example, FIG. 4 is a graph showing temperatures attained in the interior volume 6 measured at the centerline of the heating element 5, at a power level of 2100 W, for an HPHT cell including a first thermal insulation layer (e.g., a thermal insulation sleeve 31) including CsCl mixed with varying amounts of an $Fe_3O_4$ additive. Similarly, FIGS. 4 and 5 are graphs showing temperatures attained in the interior volume 6, at a power level of 2100 W, for an HPHT cell including a first thermal insulation layer (e.g., a thermal insulation sleeve 31) including CsCl mixed with varying amounts of $Fe_3O_4$, Fe, Nb, $LaCrO_3$, or Al. In each of these instances, the CsCl and the additive were combined by way of dry powder mixing. The additive, however, may be combined with CsCl, CsBr, or CsI by any suitable method.

Figure 3:
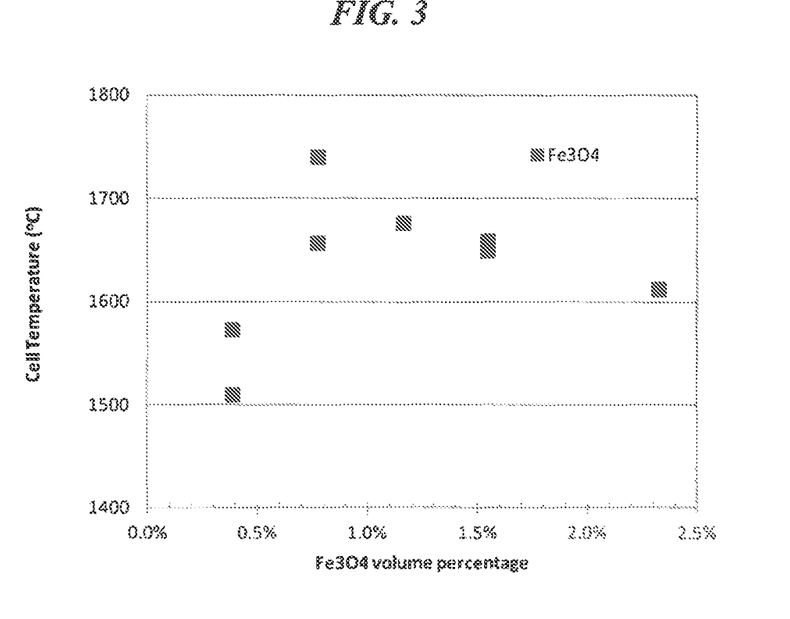
FIG. 3 is a graph of the cell temperature (° C.) achieved by heating examples of a high-pressure high-temperature cell at a fixed power level of 2100 W vs. the volume percent of an $Fe_3O_4$ additive included in each high-pressure high-temperature cell in a thermal insulation sleeve including CsCl.

Mixing the CsCl with a small amount of an additive, such as an additive capable of reflecting and/or absorbing thermal radiation, can dramatically increase the temperature of the cell working volume 6. As can be seen in FIGS. 3 through 5, mixing CsCl with an $Fe_3O_4$, Fe, Nb, $LaCrO_3$, or Al additive can increase the temperature of the interior volume 6 by as much as 250° C. or more. FIGS. 3 and 4 also show that when the first thermal insulation layer (e.g., thermal insulation sleeve 31) did not include an additive (e.g., included CsCl without an additive), the temperature of the interior volume 6 was about 1450 to 1500° C. Similarly, a cell including a cubic $ZrO_2$ thermal insulation sleeve also attains an interior volume 6 temperature of about 1500° C., for the same level of power input.

FIGS. 3 through 5 also show that the temperature increase provided by the additive may abate when the additive is included in the first thermal insulation layer in excess. Indeed, because the additive may have a thermal conductivity that is higher than that of CsCl, CsBr, or CsI, including the additive in the thermal insulation sleeve in excess may raise the thermal conductivity of the first thermal insulation layer. By raising the thermal conductivity of the first thermal insulation layer, the additive may increase the amount of heat that can be conducted away from the interior volume 6 by way of the first thermal insulation layer. As can be seen in FIGS. 3 through 5, for most of the additives, the temperature increase realized in the interior volume 6 actually diminished when the additive was included in the first thermal insulation layer beyond a certain amount. With the exception of LaCrO$_3$, the additives studied have a thermal conductivity that is higher than that of CsCl. FIG. 4 shows that the increase in the temperature of the interior volume 6 did not abate over the range of amounts of Fe and LaCrO$_3$ additives studied.

Including the additive in the first thermal insulation layer reduces the amount of heat that is radiated (i.e., emitted) away from the interior volume 6, while at the same time, if the amount of additive included in the first thermal insulation layer exceeds a certain amount, the further addition of the additive to the first thermal insulation layer may increase the amount of heat that is conducted away from the interior volume 6, thereby reducing the temperature realized in the interior volume 6. Accordingly, the amount of the additive included in the first thermal insulation layer should be selected in view of both the thermal conduction, thermal reflection, and/or thermal absorption properties of the first thermal insulation layer. For example, the additive may be present in the first thermal insulation layer in an amount in a range of about 0.01 to about 50 volume percent based on the total volume of the first thermal insulation layer. In other embodiments, the additive is present in the first thermal insulation layer in an amount of less than 5 volume percent based on the total volume of the first thermal insulation layer. The amount of the additive, however, may depend upon the composition of the additive. For example, when the additive includes a conductive material such as Ni, Fe, Cr, Mo, Ta, or mixtures thereof, the additive may be present in an amount of less than 5 volume percent based on the total volume of the first thermal insulation layer. When the additive includes Fe$_3$O$_4$, the additive may be present in an amount in a range of about 0.01 to about 2.0 volume percent. When the additive includes Nb, the additive may be present in an amount in a range of about 0.01 to about 4.0 volume percent, or about 2.0 to about 4.0 volume percent. When the additive includes Al, the additive may be present in an amount in a range of about 0.01 to about 3.0 volume percent. Embodiments of the HPHT cell may be included in any suitable HPHT press system.

Examples of embodiments are also directed to a high-pressure high-temperature cell including a current path through a thermal insulation layer and electrically connected to a heating element, the current path having an indirect path through the thermal insulation layer. In some embodiments, the current path having an indirect path is for conducting an electric current. As used herein, the phrase "indirect path" refers to a current path having at least a first portion and a second portion extending from the first portion at an angle other than a straight angle (e.g., at an angle other than 0 degrees, 180 degrees, or multiples thereof). For example, the current path 2 in the embodiment shown in FIG. 1 has an indirect path through a thermal insulation layer, which, in this embodiment, includes the first thermal insulation layer 3 and the second thermal insulation layer 1. As shown in FIG. 1, the current path 2 includes a first portion 41, a second portion 43 extending from the first portion 41 at an angle, a third portion 45 extending from the second portion 43 at an angle, and a fourth portion 47 extending from the third portion 45 at an angle. Additionally, the current path in the embodiment shown in FIG. 2 has an indirect path through a thermal insulation layer, which, in this embodiment, includes the first thermal insulation layer 3, the second thermal insulation layer 1, and the third thermal insulation layer 20. As discussed above, the current path 2 is electrically connected to the heating element 5, which at least partially surrounds the interior volume 6.

Portions of embodiments of the current path will now be described in more detail with reference to FIGS. 6-8. FIGS. 6A-6C are partial schematic views of the current path 2 and 202 of the embodiments of HPHT cells shown in FIGS. 1 and 2, respectively. As shown in FIGS. 6A-6C, in one embodiment, the portion of the current path 2 corresponding to component 43 is in the shape of a cylinder in the thermal insulation layer (e.g., the first thermal insulation layer 32 and 33). FIG. 6B also shows the disc-shaped component 45 that electrically connects component 43 to the remainder of the current path 2. FIG. 6C is a partially exploded schematic view showing the arrangement of the component 43 of the current path 2 relative to the first thermal insulation layer 32 and 33.

As described above with respect to FIG. 1, HPHT cells are heated by allowing an electric current to flow from the anvil 12 at one end of the cell through the current path 2 to the heating element 5 and then through the corresponding components at the opposite end of the HPHT cell. Referring to FIG. 6B, as electric current flows through the current path 2, it flows between the components 43 and 45, which extend in two different directions in the thermal insulation layer. By extending in two different directions in the thermal insulation layer, the components 43 and 45 of the current path 2 form an indirect path through the thermal insulation layer. In some embodiments, the current path extends in at least three different directions in the thermal insulation layer.

In some embodiments, the remaining components of the current path 2 (not shown in FIGS. 6A-6C, but shown in FIGS. 1 and 2), which electrically connect components 43 and 45 to the anvil 12, do not form a direct path with the component 43. For example, in one embodiment, the current path includes a first portion (e.g., component 43) and a second portion (e.g., component 47 in FIG. 1) in a staggered configuration. By having these two portions (e.g., components 43 and 47) in a staggered configuration, the current path 2 forms an indirect path through the thermal insulation layer.

Figure 6A:
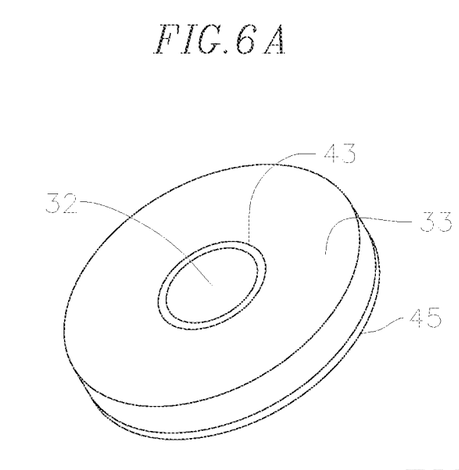
FIGS. 6A through 6C are schematic views of a portion of an embodiment of a current path and a thermal insulation layer.
Figure 6B:
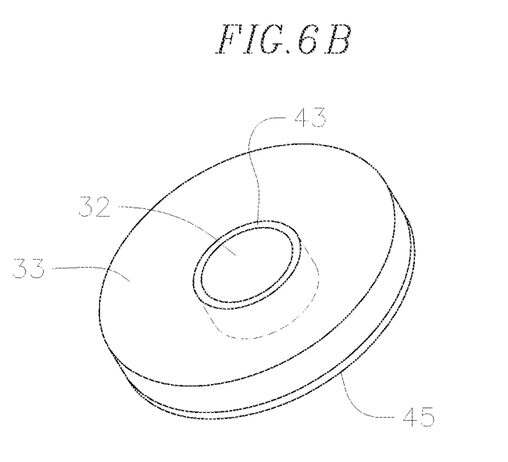
Figure 6C:
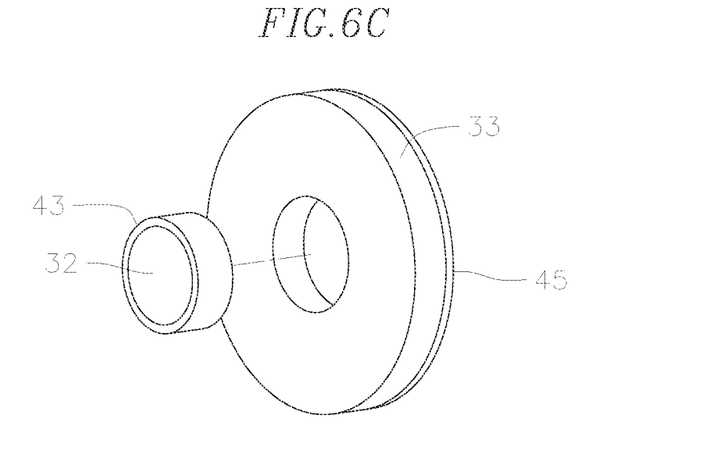

For example, in one embodiment, the current path 2 includes a cylindrical component 43 and a disc-shaped component 45, as shown in FIGS. 6A-6C, while the remaining portion (e.g., component 47 in FIG. 1) of the current path 2 between the disc-shaped component 45 and the anvil 12 is also shaped as a cylinder in the thermal insulation layer, as can be seen in FIGS. 1 and 2. In those embodiments, the current path includes at least two electrically connected coaxial cylinders, one of the cylinders having a larger diameter than that of the other cylinder. For example, component 47 of FIG. 1 is a cylinder having a diameter larger than that of component 43, which is also a cylinder. As can be seen in FIGS. 1 and 2, because one of the cylinders (e.g., component 47 or 247) has a diameter larger than that of the other cylinder (e.g., component 43 or 243), the sides of the cylinders do not align with one another and, therefore, do not form a direct path, but instead form an indirect path through the thermal insulation layer. The remaining portion of the current path 2, however, is not limited to the shape of a cylinder. Rather, the remaining portion of the current path can be any shape that will not form a direct path with the component 43 of the current path 2 (e.g., any shape that will not align with the component 43 in such a manner as to form a direct path). For example, the remaining portion of the current path can be in the shape of a plate, two or more plates, a cone, a wire, two or more wires, and the like.

FIGS. 7A-7D are partial schematic views of the current path 2 according to another embodiment. As shown in FIGS.

7A-7D, in this particular embodiment, the portion of the current path 2 corresponding to components 341 and 343 is in the form of two or more bent pieces that pass through the thermal insulation layer (e.g., the first thermal insulation layer 3). For example, as can be seen in FIGS. 7A-7D, the disc-shaped component 341, which electrically connects the component 343 to the heating element (not shown), may be formed by two separate pieces 342. FIGS. 7A-7D also show a disc-shaped component 345 that electrically connects component 343 to the remainder of the current path 2 (e.g., the portion of the current path 2 that electrically connects the anvil 12 to the component 345). FIGS. 7C and 7D are partially exploded schematic views showing the arrangement of the components 341 and 343 of the current path 2 relative to a first thermal insulation layer 333. The component 343 may be formed by two or more separate pieces. For example, as shown in FIG. 7C, component 343 may be formed by two separate pieces 344, or, as shown in FIG. 7D, component 343 may be formed by four separate pieces 346. As can be seen in FIGS. 7C and 7D, the first thermal insulation layer 333 includes an elongated slot to accommodate the component 343 (e.g., 344 or 346) of the current path 2.

Figures 7A, 7B:
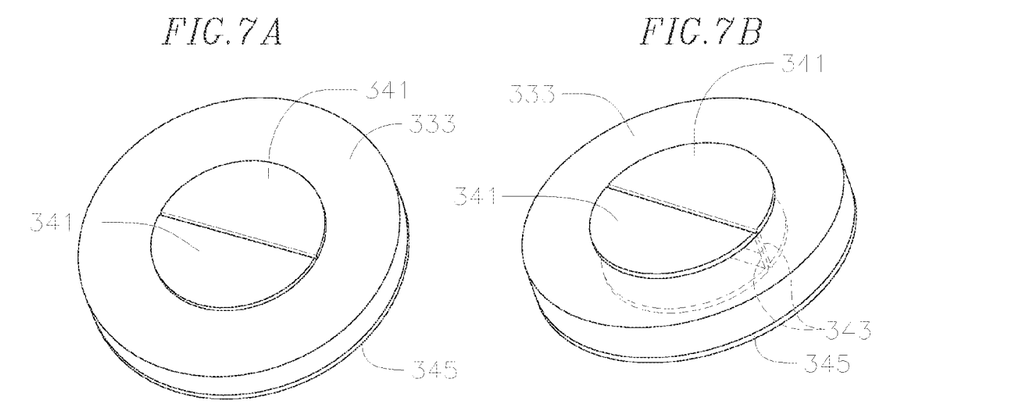
FIGS. 7A through 7D are schematic views of a portion of another embodiment of a current path and a thermal insulation layer.
Figures 7C, 7D:
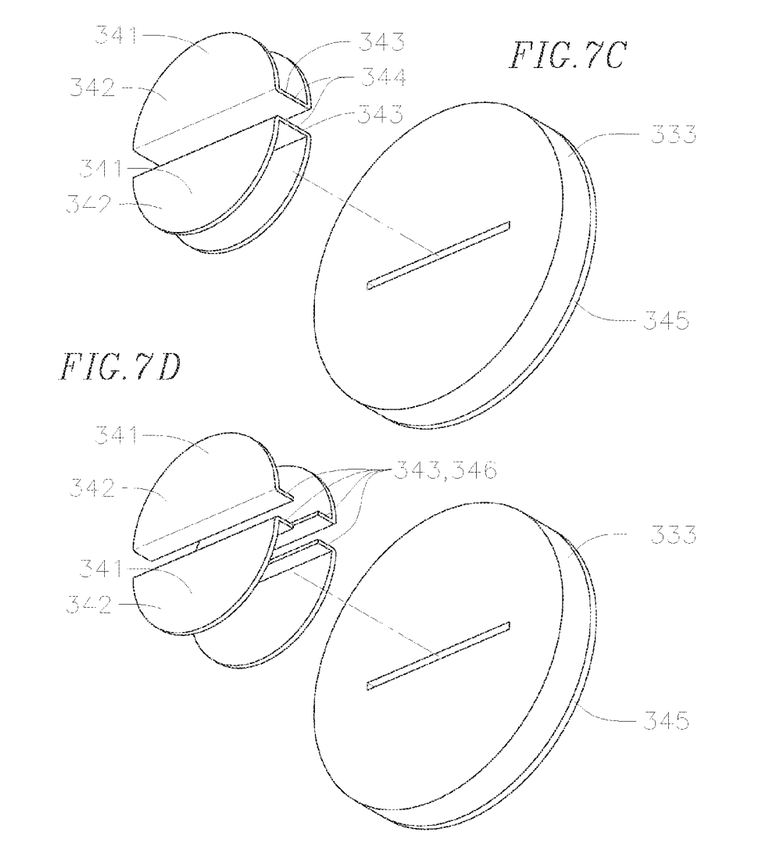

Referring to FIGS. 7B and 7C, as electric current flows through the current path 2, it flows between the components 343 and 45, which extend in two different directions in the thermal insulation layer. By extending in two different directions in the thermal insulation layer, the components 343 and 345 of the current path 2 form an indirect path through the thermal insulation layer. The remaining components of the current path may be arranged in substantially the same manner as described above with respect to the embodiments shown in FIGS. 1, 2 and 6A-6C and, therefore, further description thereof will be omitted here.

Figure 8A:
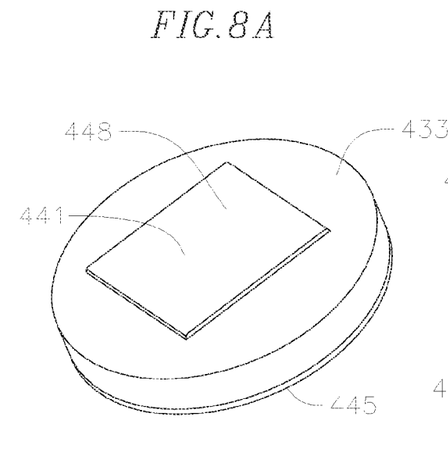
FIGS. 8A through 8C are schematic views of a portion of another embodiment of a current path and a thermal insulation layer.
Figure 8B:
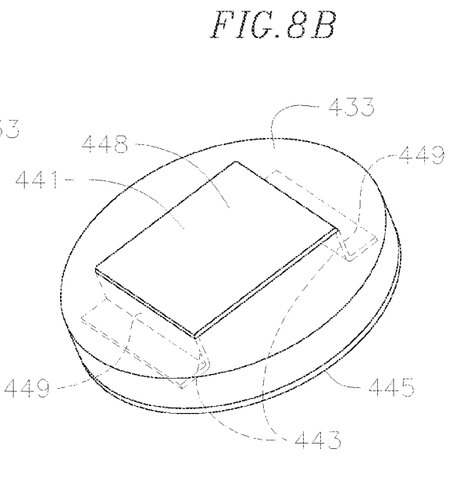
Figure 8C:
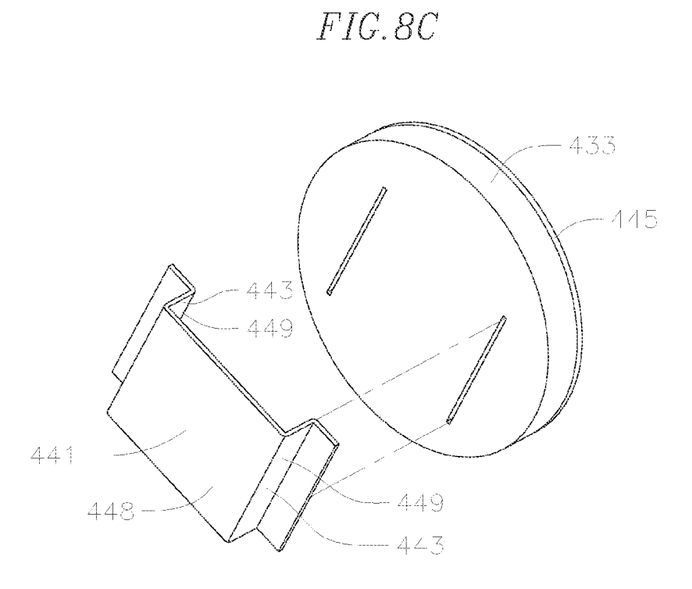

FIGS. 8A-8C are partial schematic views of the current path 2 according to another embodiment. As shown in FIGS. 8B and 8C, in this particular embodiment, the portion of the current path 2 corresponding to component 443 is in the shape of two quadrangular (e.g., rectangular) plates 449 in the thermal insulation layer (e.g., the first thermal insulation layer 433). FIGS. 8A-8C also show a quadrangular-shaped (e.g., square-shaped) component 441 (or 448) that electrically connects the component 443 to the heating element (not shown). FIGS. 8B and 8C also show a disc-shaped component 445 that electrically connects component 443 to the remainder of the current path 2 (e.g., the portion of the current path 2 that electrically connects the anvil 12 to the component 445). FIG. 8C is a partially exploded schematic view showing the arrangement of the components 441 and 443 of the current path 2 relative to the thermal insulation layer (e.g., a first thermal insulation layer 433). As can be seen in FIG. 8C, the thermal insulation layer includes two elongated slots to accommodate component 443 (e.g., the two quadrangular plates 449) of the current path 2.

Referring to FIGS. 8B and 8C, as electric current flows through the current path 2, it flows between the components 443 (449) and 445, which extend in two different directions in the thermal insulation layer. By extending in two different directions in the thermal insulation layer, the components 443 (449) and 445 of the current path 2 form an indirect path through the thermal insulation layer. The remaining components of the current path may be arranged in substantially the same manner as described above with respect to the embodiments shown in FIGS. 1, 2 and 6A-6C and, therefore, further description thereof will be omitted here.

In each of the embodiments described above, the current path 2 has an indirect path through the thermal insulation layer. By including a current path having an indirect path through the thermal insulation layer, embodiments of the of the HPHT cell are arranged such that there is no direct path for heat flow out of the cell through the materials of the current path. For example, as shown in the above embodiments, the current path directs heat (e.g., can be configured to direct heat) from the heating element toward the thermal insulation layer and the thermal insulation layer reflects heat (e.g., can be configured to reflect heat toward the interior volume). As a result, heat flow out of the interior volume of the HPHT cell is reduced. Additionally, the heat that does flow out of the interior volume of the HPHT cell is more diffused, which reduces the formation of patterns of localized heating on the hard-metal tooling components (e.g., anvils), thereby improving the durability and service life of these components.

In contrast to the indirect current path, HPHT cells that include a current path having a direct path through a thermal insulation layer allow excessive amounts of heat to escape the interior volume of the HPHT cell, as the current path provides a direct path for heat flow out of the cell. When the current path has a direct path through the thermal insulation layer, heat can directly flow out of the cell interior volume through the high thermal conductivity materials that form the current path (e.g., the electrical circuit), which may be formed of materials such as metals or graphite. When excessive amounts of heat flow out of the cell interior volume, localized hot spots can form on the hard-metal press tooling components (e.g., anvils) which can reduce the service life of these components.

Figure 9:
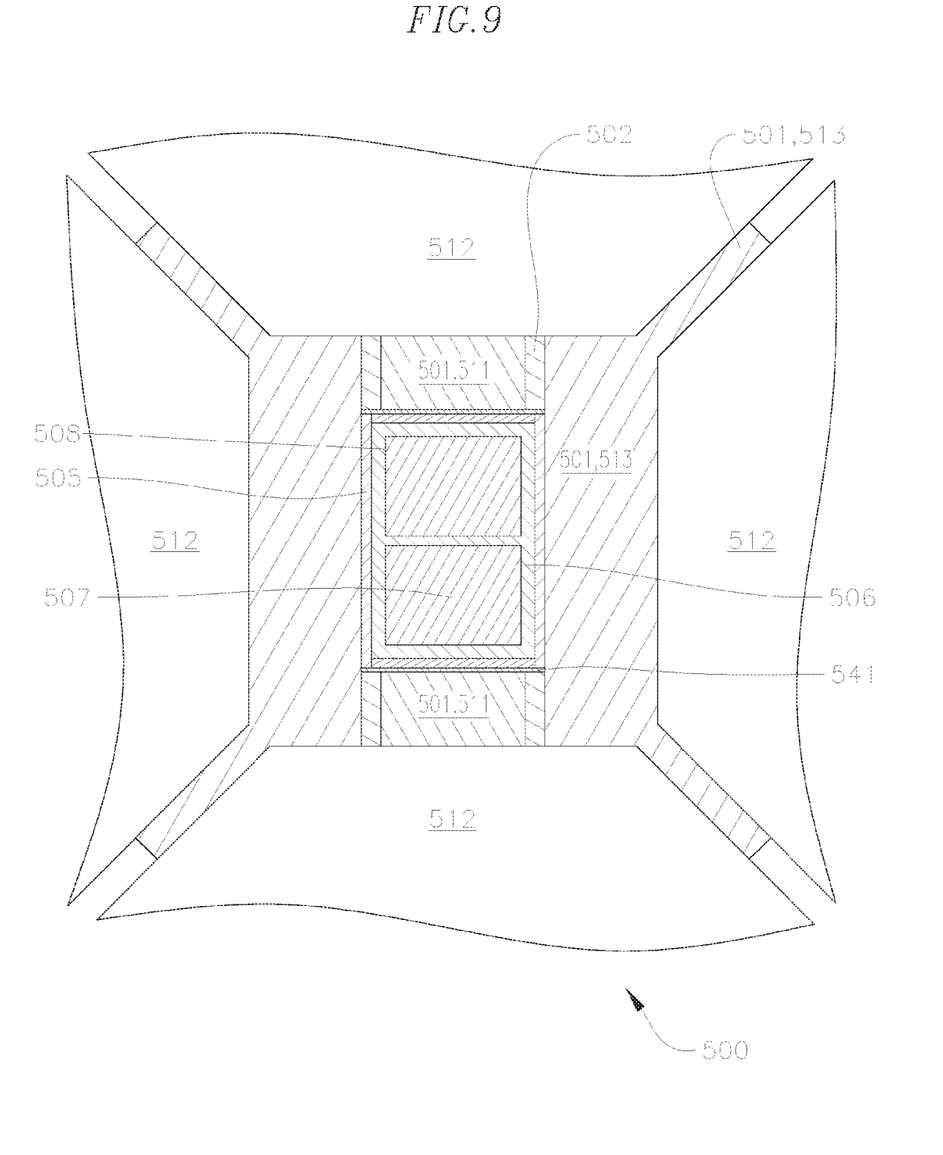
FIG. 9 is a schematic cross-sectional view of a comparative example of a high-pressure high-temperature cell of a high-pressure high-temperature press.

FIG. 9 is a schematic view of an HPHT cell 500 according to a comparative example, which includes a current path 502 having a direct path through the thermal insulation layer 501 (e.g., thermal insulation layer 511 and 513). The HPHT cell 500 shown in FIG. 9 heats an interior volume 506 (which includes the product being manufactured 507 and the pressure transfer medium 508) by allowing electric current to flow from an anvil 512 at one end of the cell through the current path 502, including component 541 of the current path 502, heating element 505 and then via the corresponding components at the opposite end of the cell to the opposite anvil 512. In the comparative example shown in FIG. 9, the current path 502 does not have an indirect path (e.g., a staggered configuration) in the thermal insulation layer (e.g., thermal insulation layer 511 and 513), and therefore, is not configured to reduce the flow of heat out of the cell 500 through the electrical circuit components. Further, the comparative example shown in FIG. 9 does not improve the thermal insulation and/or gasketing performance of the HPHT cell 500 by selective choice of materials in a first thermal insulation layer and a second thermal insulation layer as described with respect to the above embodiments. Instead, the comparative example shown in FIG. 9 includes a single thermal insulation layer (e.g., thermal insulation layer 501, which has components 511 and 513), the entirety of such single thermal insulation layer 501 having the same (or substantially the same) composition and not including second or third thermal insulation layers as shown in FIGS. 1 and 2.

Figure 10:
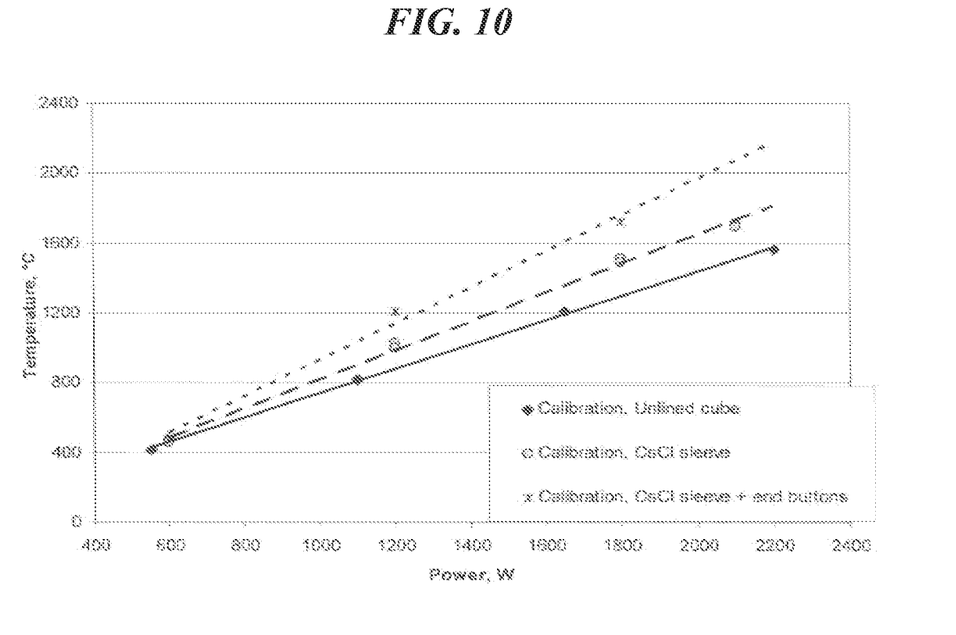
FIG. 10 is a graph of the cell temperature (° C.) achieved by heating, at various power levels, examples and comparative examples of HPHT cells.

FIG. 10 is a graph showing heating test results for an HPHT cell including a single thermal insulation layer and a current path having a direct path through the thermal insulation layer (i.e., the HPHT cell 500 schematically shown in FIG. 9) with embodiments of an HPHT cell. The graph in FIG. 10 shows the temperatures attained in the interior volume measured at the centerline of the heating element at various power levels. The heating test results for the comparative example are shown by the diamond-shaped data points and the solid line.

In FIG. 10, the circle-shaped data points and dashed line correspond to an embodiment that includes a first thermal insulation layer (i.e., a thermal insulation sleeve 31 or 231 as shown in FIGS. 1 and 2) and a second thermal insulation layer 11 (or 211) and 13 (or 213), but not a thermal insulation button 32 (or 232) and 33 (or 233). Additionally, in this particular embodiment, the current path 2 had a direct path through the thermal insulation layer 11 (or 211) and 13 (or 211).

In FIG. 10, the asterisk-shaped data points and dotted line correspond to an embodiment that includes a first thermal insulation layer (i.e., a thermal insulation sleeve 31 and thermal insulation button 32 and 33) and a second thermal insulation layer 11 and 13. Additionally, in this particular embodiment, the current path 2 had an indirect path through the thermal insulation layer, which includes the first thermal insulation layer and the second thermal insulation layer. This particular embodiment is schematically represented in FIG. 1.

As can be seen in FIG. 10, examples of the HPHT according to embodiments described herein cell attained higher temperatures and exhibited superior insulation characteristics as compared to the HPHT cell that included a single thermal insulation layer and a current path having a direct path through the thermal insulation layer (an example of which is shown in FIG. 9), especially at relatively higher power levels. Additionally, the HPHT cell including a first thermal insulation layer (e.g., including a thermal insulation sleeve 31 and a thermal insulation button 32 and 33), a second thermal insulation layer and a current path having an indirect path, attained higher temperatures and exhibited superior insulation characteristics as compared to the HPHT cell that included a thermal insulation sleeve (but not a thermal insulation button), a second thermal insulation layer and a current path having a direct path through the second thermal insulation layer. Accordingly, embodiments of the HPHT cell provide superior thermal insulation characteristics and can facilitate the retention of heat in the interior volume of the HPHT cell, thereby increasing the temperature that can be attained in the interior volume.

Embodiments of the HPHT cell are not limited to a particular type of cell. For example, the above-described HPHT cells can be used with multianvil cells, such as those described in Walker, David, *Lubrication, gasketing, and precision in multianvil experiments*, American Mineralogist, Vol. 76, 1092-1100 (1991); Shatskiy, T., et al., *High pressure generation using scaled-up Kawai-cell*, Physics of the Earth and Planetary Interiors, (Aug. 11, 2011); Frost, *A new large-volume multianvil system*, Physics of the Earth and Planetary Interiors, Vol. 143, Issue 1-2, 507-514 (2004); and Appendix 1 of U.S. Provisional Application Ser. No. 61/621,911, the entire contents of each of which are herein incorporated by reference. In particular, embodiments of the HPHT cell can be used in a uniaxial multianvil press in which load is transmitted to six wedges, which in turn load up eight anvils surrounding a press cube. Anvils of embodiments of the HPHT cell can also be used in a six anvil cubic press which is used to load an eight anvil system as shown in Appendix 1 of U.S. Provisional Application Ser. No. 61/621,911. In addition, embodiments of the HPHT cell may be used in a belt press, a piston-cylinder press or a toroidal press, which are known to those of skill in the art.

Embodiments of the present disclosure also relate to HPHT press systems including any of the foregoing HPHT cells, either alone or in combination.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A high-pressure high-temperature cell comprising:
   an interior volume; and
   two or more thermal insulation layers comprising:
      a first thermal insulation layer at least partially surrounding the interior volume and comprising a first thermal insulation material selected from the group consisting of cesium chloride (CsCl), cesium bromide (CsBr), cesium iodide (CsI) and combinations thereof and an electrically conductive additive, wherein the first thermal insulation layer has an electrical resistivity of more than 0.1 ohm·cm; and
      a second thermal insulation layer at least partially surrounding the first thermal insulation layer and comprising a second thermal insulation material, the second thermal insulation material being different from the first thermal insulation material.

2. The high-pressure high-temperature cell of claim 1, wherein the first thermal insulation layer reflects heat and the second thermal insulation layer seals the high-pressure high-temperature cell.

3. The high-pressure high-temperature cell of claim 1, wherein the electrically conductive additive reflects and/or absorbs thermal radiation.

4. The high-pressure high-temperature cell of claim 1, wherein the electrically conductive additive is present in the first thermal insulation layer in an amount in a range of about 0.1 to about 50 volume percent based on the total volume of the first thermal insulation layer.

5. The high-pressure high-temperature cell of claim 1, wherein the electrically conductive additive is present in the first thermal insulation layer in an amount of less than 5 volume percent based on the total volume of the first thermal insulation layer.

6. A high-pressure high-temperature press system comprising the high-pressure high-temperature cell of claim 1.

7. A high-pressure high-temperature cell comprising:
   an interior volume;
   a heating element at least partially surrounding the interior volume;
   a thermal insulation layer at least partially surrounding the heating element;
   at least one anvil; and
   a current path through the thermal insulation layer and electrically connecting the heating element to the at least one anvil, the current path having an indirect path through the thermal insulation layer.

8. The high-pressure high-temperature cell of claim 7, wherein the current path directs heat from the heating element toward the thermal insulation layer and the thermal insulation layer reflects the heat toward the interior volume.

9. The high-pressure high-temperature cell of claim 7, wherein the current path extends in at least two different directions in the thermal insulation layer.

10. The high-pressure high-temperature cell of claim 7, wherein the current path extends in at least three different directions in the thermal insulation layer.

11. The high-pressure high-temperature cell of claim 7, wherein the current path comprises at least two electrically connected coaxial cylinders, one of the cylinders having a larger diameter than that of the other cylinder.

12. The high-pressure high-temperature cell of claim 7, wherein the thermal insulation layer comprises a first thermal insulation layer at least partially surrounding the heating element and comprising a first thermal insulation material, and a second thermal insulation layer at least partially surrounding the first thermal insulation layer and comprising a second thermal insulation material, the second thermal insulation material being different from the first thermal insulation material.

13. The high-pressure high-temperature cell of claim 12, wherein the current path comprises a first portion in the first thermal insulation layer and a second portion in the second thermal insulation layer, and the first portion and the second portion are in a staggered configuration.

14. The high-pressure high-temperature cell of claim 12, wherein the first thermal insulation layer comprises a material selected from the group consisting of cesium chloride (CsCl), cesium bromide (CsBr), cesium iodide (CsI) and combinations thereof, and the second thermal insulation layer comprises pyrophyllite or a synthetic gasket material.

15. The high-pressure high-temperature cell of claim 12, wherein the thermal insulation layer further comprises a third thermal insulation layer between the second thermal insulation layer and a portion of the current path.

16. The high-pressure high-temperature cell of claim 15, wherein the third thermal insulation layer comprises a third thermal insulation material that is the same as the first thermal insulation material.

17. A high-pressure high-temperature press system comprising the high-pressure high-temperature cell of claim 7.

18. A high-pressure high-temperature cell comprising:
an interior volume;
a thermal insulation layer at least partially surrounding the interior volume comprising an electrically conductive additive, wherein the thermal insulation layer has an electrical resistivity of more than 0.1 ohm·cm; and
a gasketing layer at least partially surrounding the thermal insulation layer.

* * * * *